N. RUGER.
CARVING MACHINE.
No. 15,441.  Patented July 29, 1856.
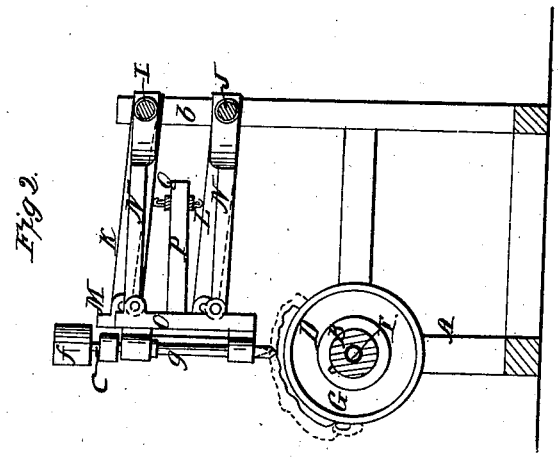
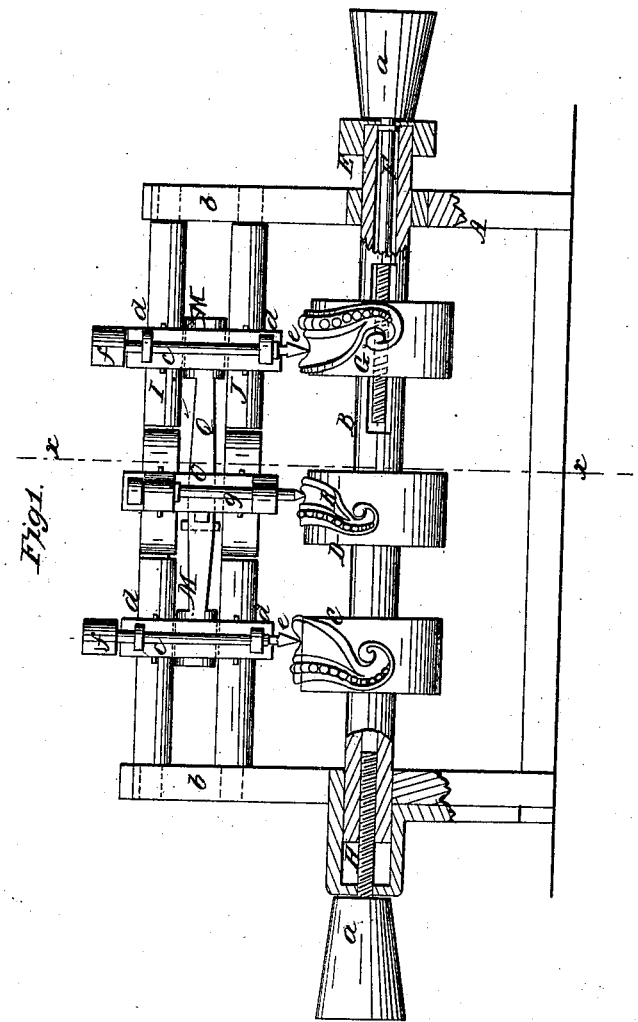

UNITED STATES PATENT OFFICE.

NELSON RUGER, OF WEST FARMS, NEW YORK.

DEVICE FOR CARVING WOOD.

Specification of Letters Patent No. 15,441, dated July 29, 1856.

*To all whom it may concern:*

Be it known that I, NELSON RUGER, of West Farms, in the county of Westchester and State of New York, have invented a new and Improved Carving-Machine; and I do hereby declare that the following is a full, clear, and exact description of the same, reference being had to the annexed drawings, making a part of this specification, in which—

Figure 1, is a front view of my improvement. Fig. 2, is a transverse vertical section of the same, (x), (x), Fig. 1, showing the plane of section.

Similar letters of reference indicate corresponding parts in the two figures.

This invention relates to a new and improved machine for carving, designed chiefly for carving portions of furniture or ornamental pieces to be attached thereto, and for similar or analogous purposes.

To enable those skilled in the art to fully understand and construct my invention, I will proceed to describe it.

A, represents a rectangular frame on the front part of which a shaft B, is placed, said shaft having two cylinders C, D, attached permanently to it. The shaft B, is allowed to slide freely in its bearings, a certain distance, and a driving pulley E, is attached to it at one end. The shaft B, has a screw F, passing longitudinally into it, at one end and the screw F, passes through a nut attached to a cylinder G, which is fitted loosely on the shaft B. A screw H, passes longitudinally into the opposite end of the shaft B, the screw H, passing through a nut in the end of the shaft. The screws have pulleys (a), on their outer ends.

I, J, represent two bars the ends of which are fitted between or in uprights (b), (b), of the frame A. The bars I, J, are placed parallel with each other, one being over the other and the bars are allowed to turn in their bearings. To the upper bar I, there are attached two arms K, K, and two corresponding arms L, L, are attached to the lower bar J, the arms of one shaft being over and in line with those of the other. To the ends of the arms K, L, there are attached, by joints, vertical bars M, which have vertical rods or arbors (c), attached to them said rods, or arbors being fitted in suitable bearings (d). To the lower ends of the rods or arbors cutters (e), are attached. The rods or arbors are rotated by belts which pass around pulleys (f), on their upper ends. To the centers of the bars I, J, there are attached arms N, one to each. These arms are fitted loosely on the bars and are allowed to turn thereon independent of the bars. The outer ends of the arms N, are connected by joints with a vertical bar O, having a vertical rod (g), attached to it said rod serving as a tracer. To the bar O, there is attached a horizontal rod P, which is between the two arms N, N. On this rod there is placed loosely a bar Q, the ends of which pass between the arms K, L, as shown in Fig. 1.

To the cylinder D, a pattern, R, is attached, and the pieces of wood to be carved similarly to the pattern R, are attached to the cylinder C, G, a rotary motion is then given the shaft B, by means of the band passing around the pulley E, and the two screws F, H, are rotated by means of belts passing around the pulleys (a), (a), the screws being rotated in reverse directions by having one of the belts crossed or by having one rod cut with a left hand screw. The pattern as it passes underneath the tracer (g), raises the arms N, the tracer falling into the depressions or cavities of the pattern by its own gravity and that of the arms N, and a corresponding motion will be given the cutters (e), (e), the bar Q, communicating said motion to the arms K, L. The cylinders C, D, are fed or moved along underneath the cutter and tracer (e), (g), by the screw H, and the work on the cylinder C, will be a fac simile of the pattern, but the work on the cylinder G, will be cut in a reverse manner although in the same form because the cylinder G, is moved in an opposite direction to the cylinders C, D. The work on the pulleys C, G, may when desired be cut larger than the pattern R, by shoving the bar Q, back on the rod P, so that the ends of the bar Q, may be nearer the bars I, J, thereby causing the outer ends of the arms K, L, to vibrate or work with a greater stroke or vibration.

The above machine is extremely simple operates rapidly and well, and by means of the reverse movement of one of the cylinders reverse copies of the pattern may be cut. This is important in carving furniture work as in corners of tables, pianofortes, etc., where the ornaments require to be placed in reverse positions in order to match.

Having thus described my invention what

I claim as new and desire to secure by Letters Patent, is—

1. I claim the cutters $c\ d\ g$, in combination with the bars I, J, having arms K, L, N, attached to them, the arms K, L, N, having bars M, O, pivoted or jointed to their outer ends to which the cutters $(e)$, and tracer $(g)$, are attached as shown and described.

2. I claim the bar Q, placed on a rod P, which is attached horizontally to the vertical bar O, the ends of the bar Q, fitting between the arms K, L, as shown for the purpose set forth.

NELSON RUGER.

Witnesses:
 WM. TUSCH,
 JAMES F. BUCKLEY.